United States Patent [19]

Künzler

[11] Patent Number: 5,568,763

[45] Date of Patent: Oct. 29, 1996

[54] CONTROLLING MEANS FOR AN AUTOMATIC COFFEE MACHINE

[75] Inventor: Bernhard Künzler, Zürich, Switzerland

[73] Assignee: HGZ Maschinenbau AG, Dallikon, Switzerland

[21] Appl. No.: 306,171

[22] Filed: Sep. 14, 1994

[30] Foreign Application Priority Data

Sep. 14, 1993 [DE] Germany ............ 43 31 164.4

[51] Int. Cl.⁶ .................................................. A47J 31/00
[52] U.S. Cl. ................... 99/280; 99/286; 426/433
[58] Field of Search ........................ 99/280–283, 286, 99/290, 289 R, 295, 300, 299; 426/432, 433, 434

[56] References Cited

U.S. PATENT DOCUMENTS

| | | | |
|---|---|---|---|
| 3,806,874 | 4/1974 | Ehrat | 340/149 |
| 4,644,571 | 2/1987 | Imai et al. | 99/280 |
| 5,072,660 | 12/1991 | Helbling | 426/433 |
| 5,094,153 | 3/1992 | Helbling | 99/286 |
| 5,186,399 | 2/1993 | Knepler | 99/286 |
| 5,207,148 | 5/1993 | Anderson | 99/280 |

FOREIGN PATENT DOCUMENTS

| | | |
|---|---|---|
| 2226137 | 3/1974 | France . |
| 3615158 | 5/1986 | Germany . |
| 900180439 | 3/1992 | Japan . |
| 2128006 | 9/1983 | United Kingdom . |

Primary Examiner—Robert W. Jenkins
Attorney, Agent, or Firm—Hopkins & Thomas

[57] ABSTRACT

A method of controlling an automatic coffee machine, and an automatic coffee machine, are disclosed. The method of controlling the automatic coffee machine includes the steps of actuating a selector switch for a first time and starting the grinding of an amount of coffee beans for a coffee brewing cycle using a first set of brewing parameters in response thereto, monitoring the selector switch for a predetermined period of time in the range of from one to two seconds, delaying the start of coffee brewing in response to the actuation of the selector switch for a second time within the predetermined time period, and then grinding an additional amount of coffee beans and resuming the coffee brewing cycle using a second set of brewing parameters in response to the second actuation of the selector switch. The first set of brewing parameters is used to brew a single size serving of coffee, and the second set of brewing parameters are used to brew a double sized serving of coffee. The step of loading the first set of brewing parameters into the control processor of the coffee machine occurs in response to actuating the selector switch for the first time, and the step of replacing the first set of brewing parameters with the second set of brewing parameters in the control processor occurs in response to actuating the selector for a second time, whereupon the start of the coffee brewing cycle is resumed using the second set of parameters to brew the coffee.

13 Claims, 3 Drawing Sheets

5,568,763

CONTROLLING MEANS FOR AN AUTOMATIC COFFEE MACHINE

FIELD OF THE INVENTION

The invention is related to a method of controlling an automatic coffee machine, which has at least one means for supplying ground coffee, a water nearing device, a heating chamber, a spout, and at least one selector, in which the controlling means starts a preparation cycle for a predetermined beverage, especially a single serving of the beverage, upon the actuation of the selector.

BACKGROUND OF THE INVENTION

An automatic coffee machine is understood to be a machine in which the steps of the preparation cycle occur automatically, especially the grinding of the coffee, the introduction of the ground coffee into the heating chamber, the brewing of the coffee, and the ejection of the used coffee in the shape of a compressed tablet of ground coffee. Only the preparation cycle itself has to be started manually by pushing a selector.

A known automatic coffee machine has a controlling means which is supplied with a relatively large number of selectors. Selectors are provided for different amounts of the beverage on the one hand and for different types of coffee on the other hand. A large, a medium, and a small cup as well as a pot are distinguished as different amounts of beverage. Types of coffee may be normal coffee, decaffeinated coffee, espresso, and the like. Two selectors arranged one above the other are usually assigned to different amounts of the same type of coffee, in which the upper selector corresponds to a single serving and the lower selector to a double serving. This is always related to the preparation of the beverage in a single cycle. When the upper selector, which is assigned to a single serving, is pushed, this predetermined single serving is prepared and served in one cycle. If, on the other hand, the lower selector, which is assigned to a double serving of the beverage, twice the amount of the beverage is prepared and served. The same double serving may also be prepared by pushing the upper selector twice; in this case the double serving is also prepared, but in two independent consecutive cycles. Due to the multitude of possible combinations of amounts and types of coffee the number of selectors becomes relatively large for such an automatic coffee machine. Usually there are 10 to 20 selectors, which not only causes a significant constructive expenditure, but which also may confuse the user of the automatic coffee machine in that there is a lack of clarity. Due to this lack of clarity the process of choosing and selecting a beverage by a user may be extended in time, which in turn can delay the distribution of coffee beverages when there is a great demand. It is therefore important to realize short serving times, especially when larger amounts, i.e. double servings, of the beverage are served.

SUMMARY OF THE INVENTION

It is the object of the invention to provide a control method of the type described above, which makes a quick serving of beverages possible, and which is user friendly and clearly designed.

According to the invention, this is obtained in that the controlling method monitors the selector a predetermined amount of time after its actuation and prolongs the start of the preparation cycle upon a renewed actuation of the selector within the predetermined amount of time for preparing a beverage with modified parameters, for example, a larger amount of beverage.

The invention is based on the idea of assigning a number of serving possibilities with one selector, depending on whether or not the selector is pushed once or twice or, for instance, a number of times in a predetermined period of time. As before, a single serving is prepared in a cycle through this controlling means when the selector is actuated once. If the selector is actuated twice within the predetermined period of time, though, a double serving is prepared. In this case two cycles do not occur consecutively, each of which would be assigned to the preparation of a single serving, but the larger amount of the beverage is prepared in a single cycle, in which the parameters of the preparation change during the cycle. This concerns especially the duration of the operation of the coffee grinder, the initial period for the addition of hot water, as well as peculiarities of typical processing steps for the amount of the beverage in question. Upon the double actuation of the selector within the predetermined period of time the amount of water may decrease and the grinding time of the coffee grinder may increase as compared to a single actuation of the selector; in other words, a change of the type of coffee may occur.

Through this new control method the number of selectors is advantageously halved, which not only benefits the clarity and decorative appearance of the front panel of the automatic coffee machine, the cost to manufacture the coffee machine is also reduced. The automatic coffee machine may be operated easier and faster, and, in spite of the simplified construction, a large number of possible choices is realized. The possible choices are also plausible, so that the operation is simplified. The preparation and serving times are also relatively short, because also the cycle assigned to a modified beverage is started with the initial actuation of the selector.

The modified beverage is created by continuation of the individual steps of the preparation cycle of the single serving. This is related especially to the grinding of the coffee, i.e. the process started at the beginning of a cycle. The further steps, which have not yet begun during the first and second actuation of the selector, may be completely exchanged with other processing steps, for example, they do not have to be continued.

The predetermined amount of time should be about 1 to 2 seconds. This period may either be fixed by a time function element, or it may be adjustable, in order to comply with typical operation behavior.

The enlarged amount of beverage may especially correspond to double the single serving of the beverage. It may also be distinguished between small and large cups in this manner. The double serving of the beverage must not necessarily correspond to a double amount of ground coffee; a reduction may be effected here.

Upon the first actuation of the selector the parameters assigned to the single serving of the beverage are loaded into a working memory and the cycle is started. The initially stored parameters are superseded by the parameters of the enlarged amount of beverage upon the renewed actuation of the selector in the predetermined amount of time, and the started preparation cycle is continued and ended with the new parameters.

It is also possible to extended the control method to a possible third actuation of the selector. In principle an extension to a multiple actuation of the selector is possible. If the number of possible actuations becomes too large, though, problems may arise in determining and carrying out the actuating cycle. When there is the possibility of three actuations, the predetermined period of time is prolonged, and it is monitored whether the selector has been actuated once, twice, or three times within the prolonged period.

The amount of ground coffee, the corresponding amount of hot water, and the pre-treatment of the coffee may at least be stored as parameters. The pre-treatment of the coffee may consist of compressing the ground coffee tablet in the heating chamber, a corresponding relief of pressure on the compressed tablet, or similar processing steps. Even though the present invention has been described only in connection with coffee as a beverage, also different types of coffee, it is understood that the invention is also applicable to the preparation of hot chocolate, the dispensing of hot water for the preparation of tea, and the like.

BRIEF DESCRIPTION OF THE DRAWINGS

A preferred embodiment of the control method according to the invention is described hereinafter with reference to the accompanying drawings, in which.

DETAILED DESCRIPTION

Figure 1:
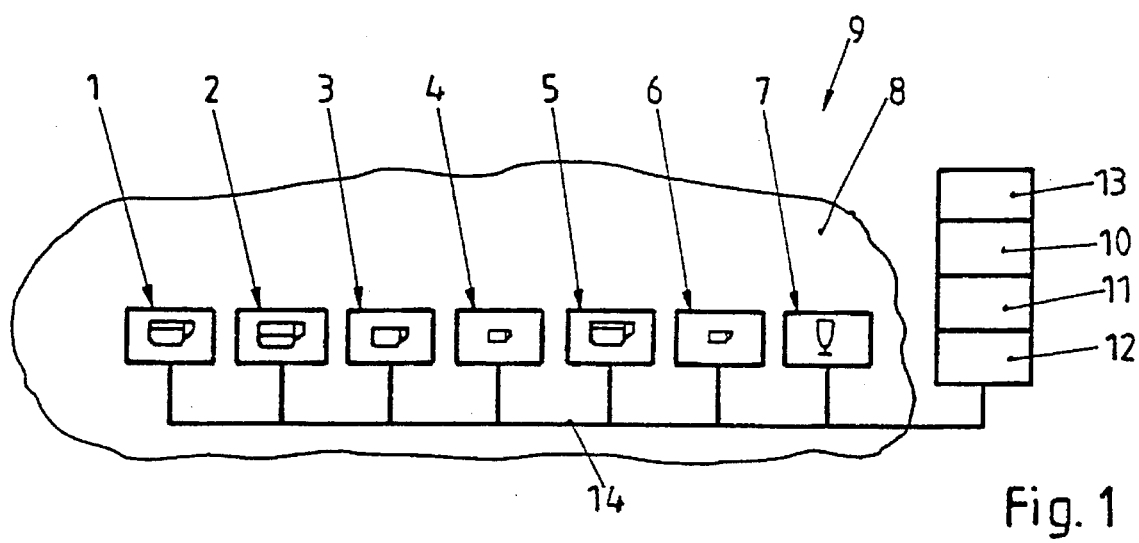
FIG. 1 is a schematic representation of the selector panel of an automatic coffee machine.

FIG. 1 shows seven selectors 1, 2, 3, 4, 5, 6, and 7 on the front operating side 8 of an automatic coffee machine 9. The selector 1 is meant for the preparation and serving of a large cup of normal coffee. The selector 2 is meant for serving a medium cup of coffee. The selector 3 is meant for the preparation of a small cup of coffee, while the selector 4 is meant for a very small cup of coffee. The selector 5 is assigned to the preparation and serving of a large cup of decaffeinated coffee, while the selector 6 is meant for a small cup of decaffeinated coffee. The selector 7 controls the serving of a special coffee. It is understood that this allocation is only an example, and that it may be fashioned for other types of coffee and other beverages, such as hot chocolate, hot water for tea, etc. Generally, actuating one of the selectors 1 to 7 once causes a single serving of the corresponding beverage to be prepared and served in a single cycle. Actuating the same selector 1 to 7 twice within a predetermined period of time causes a double serving of the beverage to be prepared and served in a single cycle. If the selector is actuated twice, but not within the predetermined period of time, though, a double serving of the beverage is prepared in two separate, consecutive cycles. This is equivalent to the actuation of the selector by two users, one after the other. A computerized control device 10, which has a working memory 11 and a time function element 12, is provided on the inside of the automatic coffee machine 9. A program memory 13 serves to store all of the different processing programs.

The control method functions as follows: When, for instance, the user of the automatic coffee machine would like to prepare a medium cup of normal coffee in a single cycle, a corresponding cup is placed underneath the dispenser, and the selector 2 is actuated once. This actuation causes the control device 10 to download the corresponding parameters for a medium cup of coffee from the program memory 13 to the working memory 11. After a very short delay the grinding process is started, and the coffee is ground into the open heating chamber. At the same time a clock is started as the time function element 12, which runs for a predetermined period of time. During this period of time the selector 2 is monitored continuously or intermittently via a corresponding wiring, which also serves to transmit other information, whether or not a second actuation occurs. If no such second actuation occurs within the time period of the time function element 12, the cycle is carried out corresponding to the program in the working memory 11. In this way the user of the automatic coffee machine 9 is served a medium cup of normal coffee, which has been prepared in a single cycle.

If the control device 10 determines that the selector 2 has been actuated twice within the time period predetermined by the time function element 12, though, corresponding to the request for a double serving of a medium cup of normal coffee, then the corresponding program is downloaded from the program memory 13 into the working memory 1i, and the previous program is erased, or superseded, so that the double serving of coffee is prepared in continuation of the initial cycle, i.e. also in a single cycle. Such a double serving of coffee may, for instance, be collected by placing two cups for medium servings underneath two dispensing pipes arranged at a distance to each other. It is also possible to place a single, larger container underneath the two dispensing pipes, the coffee being served into the container through both of the dispensing pipes.

If the second actuation does not occur within the period of time predetermined by the time function element 12, though, but delayed in time in a way that the second actuation occurs after the period of time predetermined by the time function element 12, then the process is equal to all processes in which the following users actuate the same selector in relatively long time intervals. Each actuation then corresponds to an individual single cycle.

Figure 2:
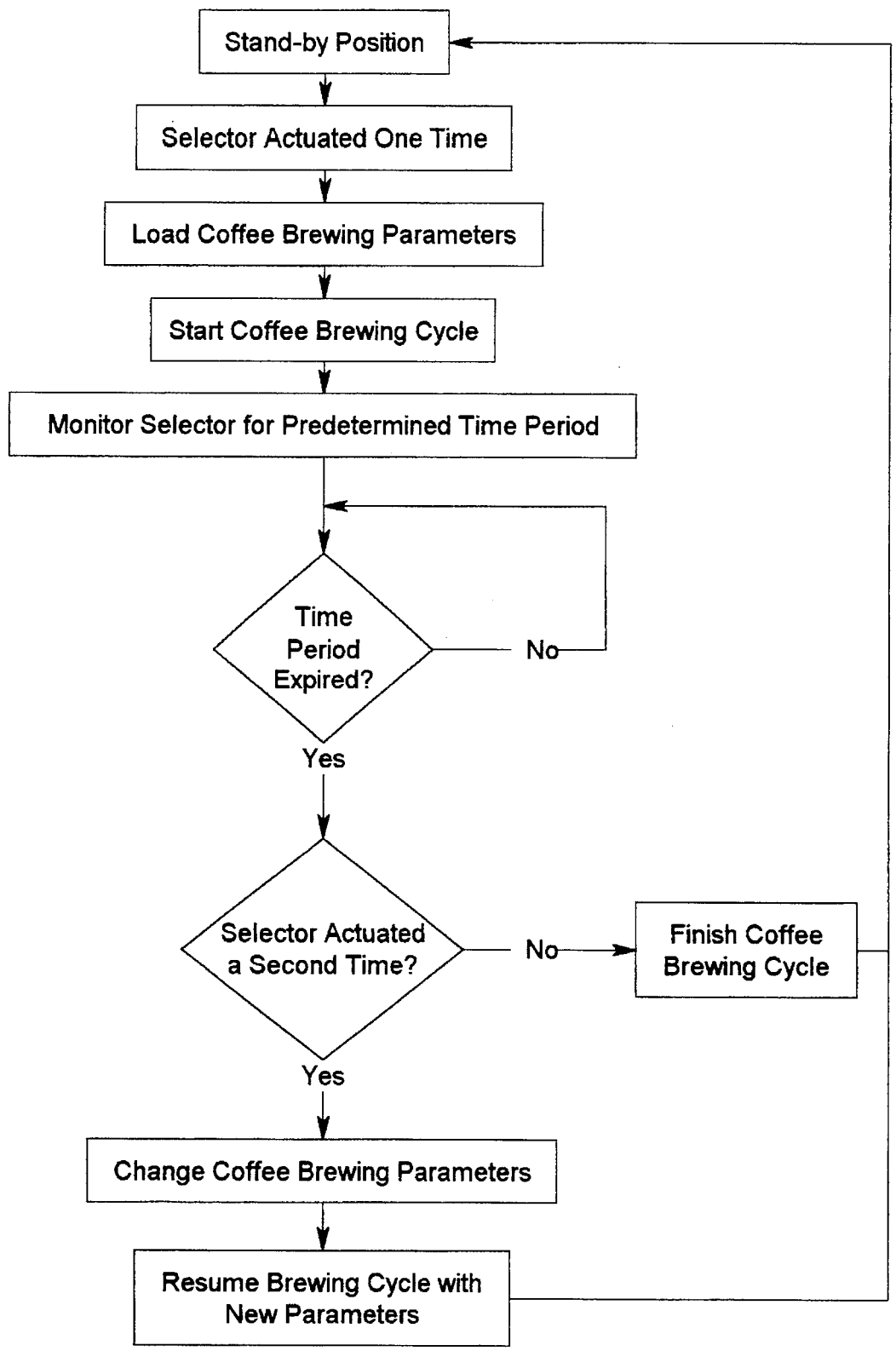
FIG. 2 is a control cycle for a coffee brewing process.
Figure 3:
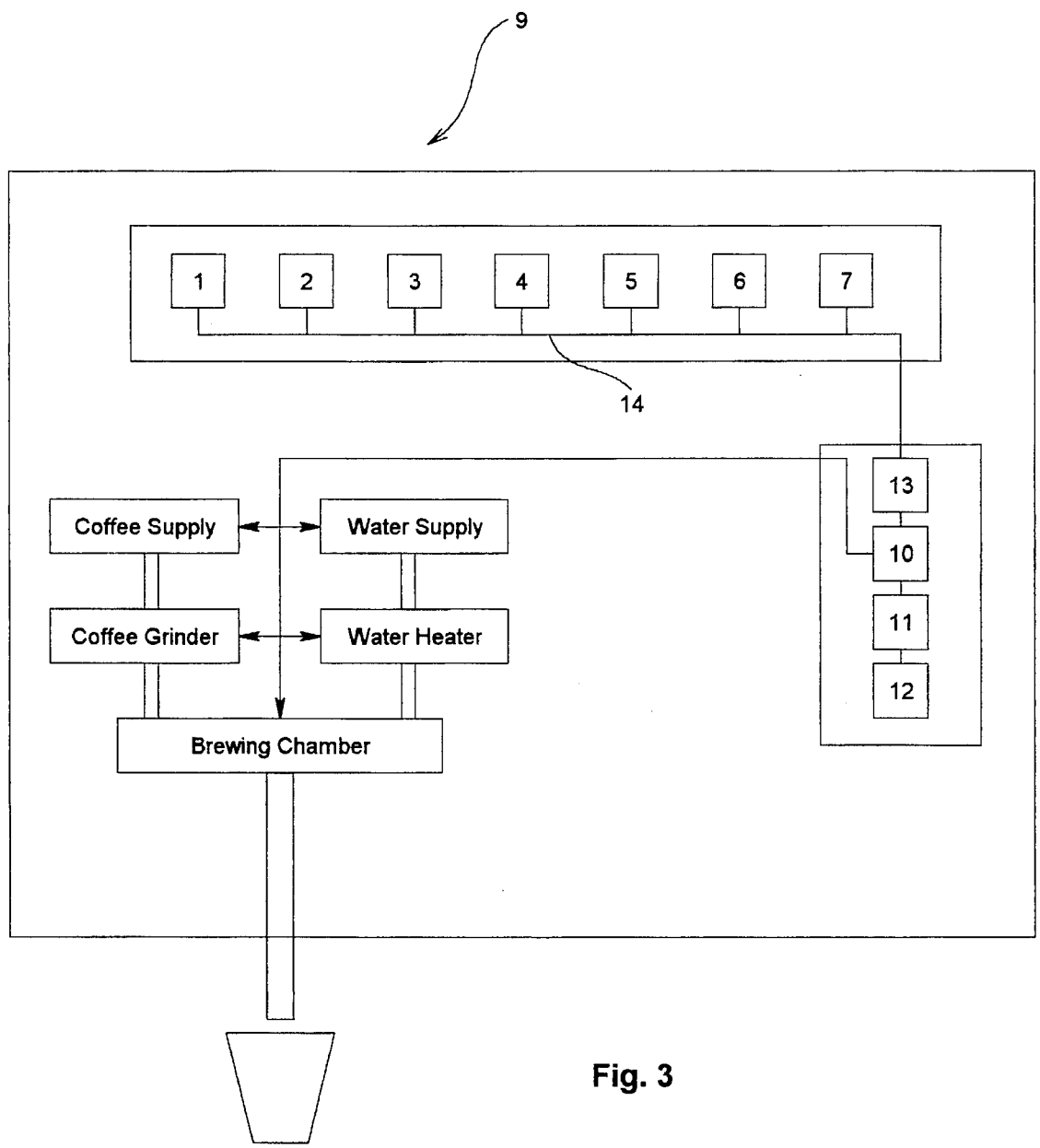
FIG. 3 is a schematic illustration of an automatic coffee machine using the control method of this invention.

With reference to FIG. 2 the course of the steps of the controlling process are described once more. At the beginning the automatic coffee machine 9 is in a stand-by mode, i.e. the automatic coffee machine is switched on, and the device for supplying hot water has reached a constant temperature. One of the selectors 1 to 7 is then actuated by the user, which causes the parameters associated with the corresponding coffee to be downloaded from the program memory 13 into the working memory 11. The cycle is started. Within the predetermined period of time it is monitored, whether or not the same selector has been actuated a second time. If this is not the case, then the first cycle is carried out. If there has been a second actuation, then the parameters are changed, and the cycle is continued with the new parameters.

LIST OF REFERENCE NUMERALS

1—selector
2—selector
3—selector
4—selector
5—selector
6—selector
7—selector
8—operating side
9—automatic coffee machine
10—control device
11—working memory
12—time function element 13—program memory
14—wiring

I claim:

1. A method of controlling an automatic coffee machine, the coffee machine having a supply of coffee beans, a coffee bean grinding device, a water heating device, a brewing chamber, and a dispenser for brewed coffee, the coffee machine also including at least one coffee selector switch in electronic communication with a control processor for operating the coffee machine, comprising the steps of:

a) actuating the selector switch a first time to enable the start of a coffee brewing cycle having a first set of brewing parameters;

b) starting the grinding of an amount of coffee beans in response to actuating the selector switch for the first time;

c) monitoring the selector switch for a predetermined period of time after the selector switch ia actuated for the first time;

d) delaying the start of the brewing of coffee in response to the actuation of the selector switch for a second time within said predetermined time period; and grinding an additional amount of coffee beans and resuming the coffee brewing cycle using a second set of brewing parameters in response to the actuation of the selector for the second time.

2. The method of claim 1, wherein step c) includes the step of monitoring the selector switch during said predetermined period of time in the range of from one to two seconds.

3. The method of claim 1, wherein step b) includes the step of setting said first set of parameters to brew a single sized serving of coffee.

4. The method of claim 3, wherein step e) includes the step of setting said second set of parameters to brew a double sized serving of coffee twice the amount of said single sized serving.

5. The method of claim 1, wherein step b) includes the step of beginning to grind an amount of coffee beans needed to make a single sized serving of coffee prior to brewing the coffee.

6. The method of claim 5, wherein step e) includes the step of grinding an additional amount of coffee beans needed to make a double sized serving of coffee prior to starting the brewing of said single sized serving of coffee.

7. The method of claim 1, wherein step b) includes the step of loading said first set of brewing parameters into the control processor of the coffee machine in response to actuating said selector for the first time, and wherein step e) includes the step of replacing said first set of parameters with said second set of brewing parameters in the control processor in response to actuating the selector for the second time, and then resuming said brewing cycle with said second set of parameters.

8. The method of claim 7, step b) including the step of loading the amount of ground coffee beans, hot water, and brewing time needed to brew a single sized serving of coffee as said first set of parameters.

9. The method of claim 7, step e) including the step of loading the amount of ground coffee beans, hot water, and brewing time needed to brew a double sized serving of coffee as said second set of parameters.

10. The method of claim 8, comprising the additional steps of:

g) once again monitoring the selector switch for said predetermined period of time after actuating the selector switch for the second time;

d) delaying the start of coffee brewing in response to the actuation of the selector switch for a third time within said predetermined time period; and e) grinding an additional amount of coffee beans and resuming the coffee brewing cycle using a third set of brewing parameters in response to the actuation of the selector for the third time.

11. An automatic coffee machine, the coffee machine having a supply of coffee beans and being separately provided with water for brewing coffee, comprising:

a coffee bean grinding device constructed and arranged to receive the coffee beans for grinding;

a water heating device in communication with the water supply;

a brewing chamber in communication with said grinding device and said water heating device;

a dispenser in communication with said brewing chamber;

the coffee machine including at least one coffee selector switch in electronic communication with a control processor;

said control processor being constructed and arranged to automatically control the coffee machine and a coffee brewing cycle using a first set of brewing parameters in response to the actuation of the selector switch for a first time, monitor the selector switch for a predetermined period of time, delay the start of the coffee brewing cycle in response to the actuation of the selector switch for a second time within said predetermined period of time, and to resume said coffee brewing cycle using a second set of brewing parameters in response thereto.

12. The coffee machine of claim 11, wherein said control processor monitors the selector switch during said predetermined period of time in the range of from one to two seconds.

13. The coffee machine of claim 11, wherein said control processor includes a program memory adapted to store said first and second sets of brewing parameters, a time function element for measuring said predetermined period of time, and a working memory into which said sets of brewing parameters are loaded during the operation of the coffee machine.

* * * * *